Nov. 13, 1951     E. C. OLIVER     2,574,586

TOOL-SUPPORTING DEVICE

Filed Oct. 11, 1946     3 Sheets-Sheet 1

INVENTOR.
Edd C. Oliver
BY Harry O. Ernsberger
ATTORNEY

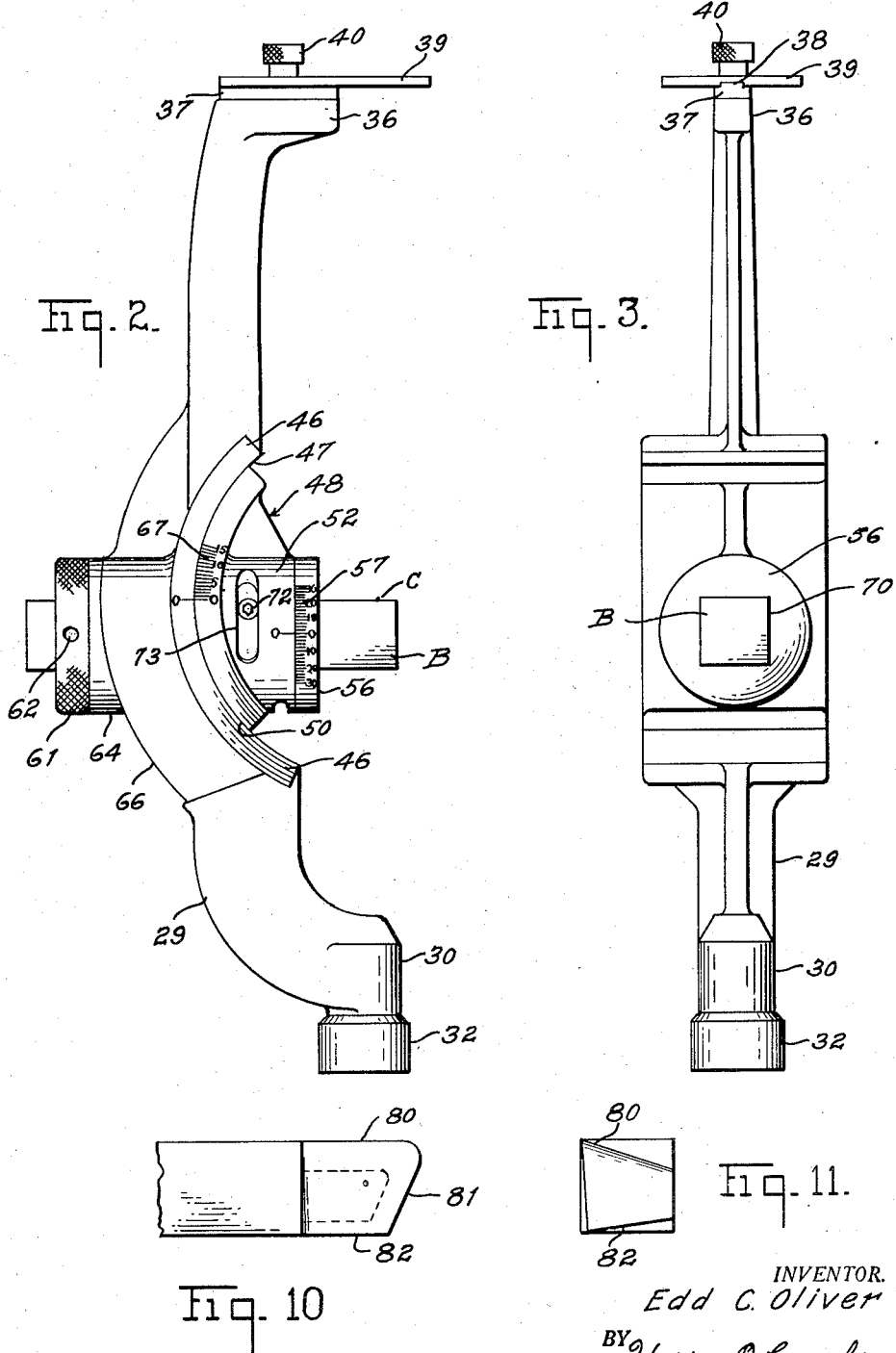

Nov. 13, 1951  E. C. OLIVER  2,574,586
TOOL-SUPPORTING DEVICE
Filed Oct. 11, 1946  3 Sheets-Sheet 3
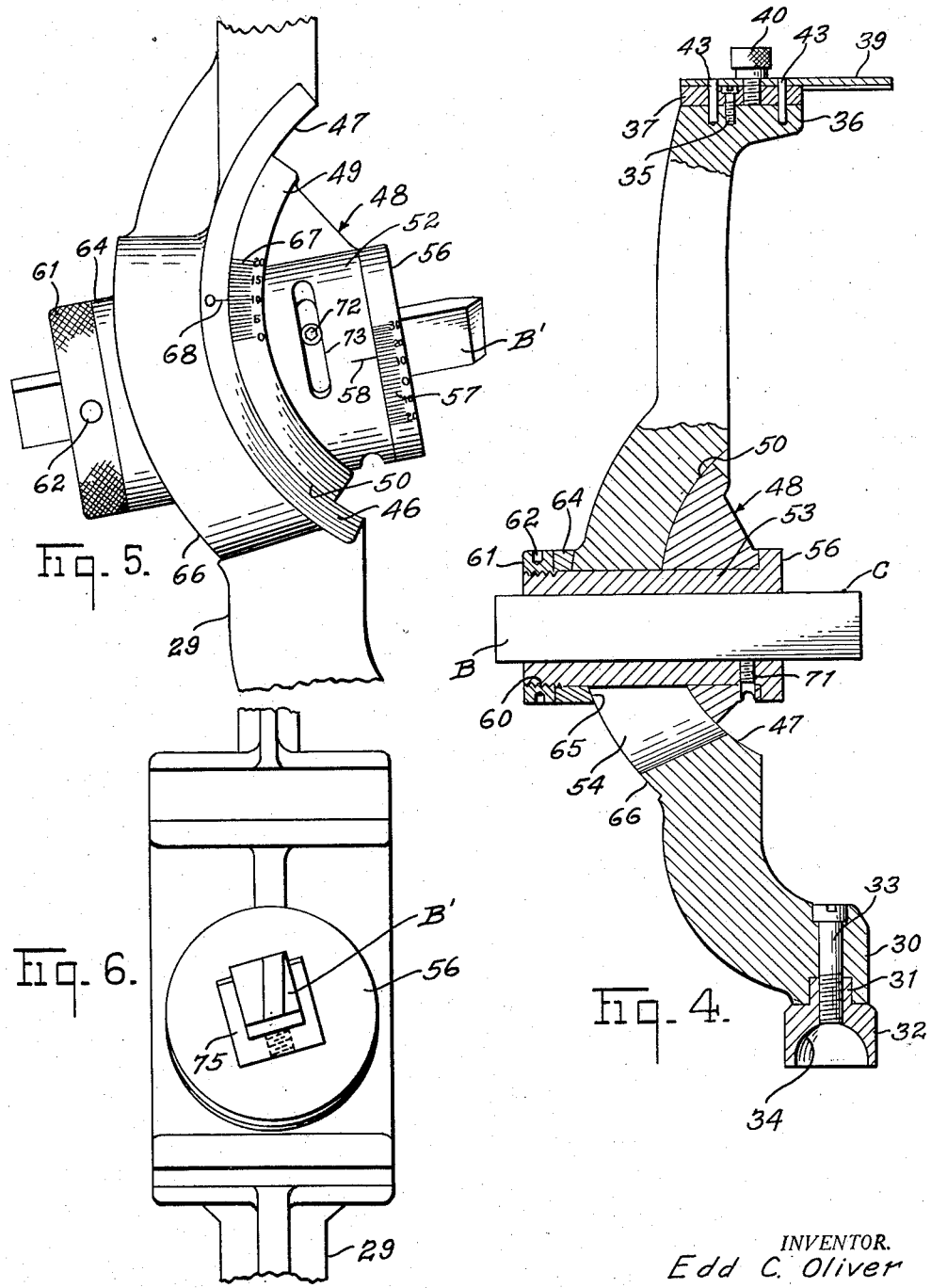
INVENTOR.
Edd C. Oliver
BY Harry O. Ernsberger
ATTORNEY Patented Nov. 13, 1951

2,574,586

UNITED STATES PATENT OFFICE 2,574,586

TOOL-SUPPORTING DEVICE

Edd C. Oliver, Adrian, Mich.; Genevieve R. Oliver, executrix of said Edd C. Oliver, deceased, assignor to Genevieve R. Oliver, Adrian, Mich.

Application October 11, 1946, Serial No. 702,770

1 Claim. (Cl. 51—127)

This invention relates to tool holding devices and more especially to an arrangement or fixture for supporting a form tool blank or tool bit during contouring, grinding or sharpening operations.

In the art of forming or grinding form tool bits for machine operations difficulties have been experienced in supporting a tool to obtain various clearance angles on tool bits. As to certain forms of tool bits it becomes necessary or desirable to impart different degrees of clearance angularity on different portions of a tool bit, for example, it may be desirable to impart a different clearance angle to each of the leading, front or trailing edge portions of the tool bit.

The present invention embraces the provision of means for supporting a form tool bit during contouring or grinding operations wherein various clearance angles may be formed on different portions of the tool bit.

The invention comprehends the provision of a tool supporting means particularly adaptable for use with a grinding machine for forming cutting edge portions upon form tool bits, the arrangement having provision of means for adjustably mounting a tool to obtain various degrees of clearance for the cutting portion of the tool bit.

Another object is the provision of a means of imparting a predetermined configuration to tool bits utilizing a template or pattern whereby the tool bit may be formed to predetermined configuration.

Still another object of the invention is the provision of a tool bit mounting fixture having a tool bit supporting means arranged for universal adjustment whereby the tool bit may be brought into engagement with a grinding or abrasive medium in a manner to impart compound angles of clearance to the tool bit.

Still a further object resides in the provision of a tool bit supporting fixture equipped with a template of larger size than the tool bit to be formed from the configuration of the template whereby a high degree of accuracy for the tool bit form is assured.

Further objects and advantages are within the scope of the invention such as relate to the arrangement, operation and function of the related elements of the structure to various details of construction and to combination of parts, elements per se, and to economies of manufacture and numerous other features as will be apparent from a consideration of the specification and drawing of a form of the invention, which may be preferred, in which:

Figure 2 is a side elevational view showing a form of tool holder of my invention;

Figure 3 is a front elevational view of the arrangement shown in Figure 2;

Figure 4 is a vertical sectional view through the tool holder;

Figure 5 is a fragmentary elevational view illustrating a compound setting for a tool bit supporting means;

Figure 6 is a front elevational view of the arrangement shown in Figure 5;

Figure 10 is a top plan view of a particular form of tool bit, and

Figure 11 is an end view of the tool of Figure 10.

While I have illustrated a form of my invention as used for supporting form tool bits during grinding operations, it is to be understood that my invention may be used with any instrumentality where it may be found to have utility.

Figure 1:
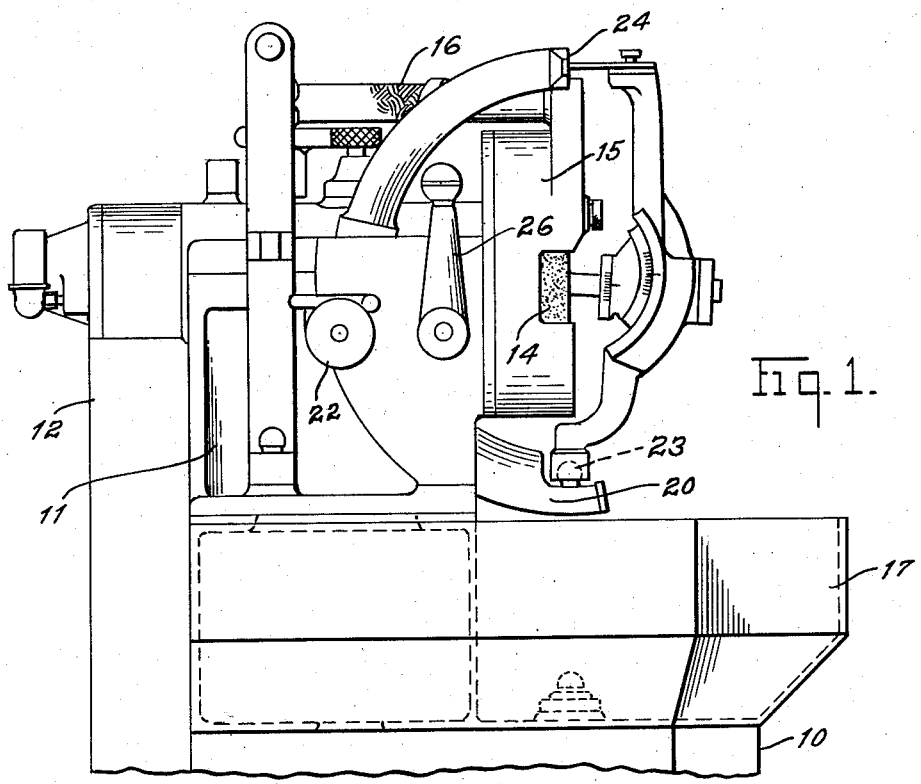
Figure 1 is an elevational view of a portion of a grinding machine with which the arrangement of my invention has particular utility.

Figure 1 illustrates a form of grinding machine with which the tool holding fixture or unit of my invention is particularly usable. The grinding machine is inclusive of a main frame or pedestal construction 10 upon which is mounted a supplemental frame 11 within which is journaled a shaft or spindle at the forward extremity of which is mounted a grinding or abrasive wheel 14. The spindle is rotated by means of belts (not shown) contained within a housing 12, the belts being driven by a motor or other suitable source of power contained within the base member 10. The abrasive wheel 14 is shrouded within a casing 15, a suitable liquid coolant being conveyed to the casing through a tube 16. The coolant, after flowing over the grinding wheel 14, passes into a flanged table 17 and into a pump mechanism (not shown) contained within the base 10 for recirculation.

The frame portion 11 is formed with an arcuate recess or channel adapted to receive a cresent shaped member 20. The member 20 is movably supported on the frame 11 and is arranged to be moved or adjusted by means of rack and pinion mechanism (not shown) the operating pinion being connected to a manipulating and indexing wheel 22. The indexing wheel 22 is calibrated to accurately locate member 20 in various angular positions with respect to the front face of the grinding wheel. Member 20 is provided with a supporting means for the tool bit retaining fixture of my invention in the form of a ball-like support 23 disposed near the lower end of member 20 while a straight edge or uniplanar surfaced member 24 is associated with the other end of member 20. A locking means (not shown) for securely positioning member 20 in adjusted position is provided which is adapted to be controlled by manipulation of lever 26.

The present invention is directed to a supporting means usable in conjunction with a grinding machine of the character above described for carrying tool bits or the like which are to be ground or contoured upon a grinding wheel. With particular reference to the structure shown in Figures 2 through 4 inclusive, the tool bit supporting means is inclusive of a fixture or holder 29 having a body portion provided with a boss portion 30 integrally formed in the lower end thereof. The boss portion 30 is formed with a cylindrical recess adapted to receive a tenon 31 of a fitting or member 32. The fitting 32 is bored and threaded to receive a bolt 33 adapted to removably secure the fitting or member 32 to the boss 30. The member 32 is formed with a semi-spherically shaped recess 34 which is adapted to snugly fit and take over the supporting means or ball 23 formed on the member 23 or other similar construction associated with a suitable grinding machine with which the tool bit holder may be employed.

The upper end of the fixture or holder 29 is formed with a laterally extending platform or ledge 36 to which is fitted a hardened plate 37 secured to the ledge by means of a screw 35, as shown in Figure 4. The plate 37 is formed with an upwardly extending tang 38 for correctly positioning a template 39. The template is formed with a recess adapted to receive the tang 38, a knurled screw 40 being provided to secure the template 39 to the fitting 37. The hardened plate or fitting is accurately located upon the ledge 36 and the template 39 accurately located with respect to the fitting by means of dowels 43. The template 39 is preconfigurated to the form that is desired to be formed on the tool bit and of large size. In the embodiment illustrated, the template contour is twice the size of the contour to be formed on the tool bit. The sizes of the template and tool bit forms are in the ratio of the distance from the center of recess 34 to the plane of the template as compared with the distance from the center of the recess 34 to the upper edge of the tool bit B.

The intermediate portion of the holder is configurated to accommodate instrumentalities for mounting and adjusting a tool to be configurated or ground to predetermined form. The holder is provided with an arcuately shaped boss portion 46, the arc or concave surface 47 being generated about the point C in the plane of the upper edge of the tool bit blank B.

There is provided adjacent the boss 46, a member 48 having a boss portion 49 provided with an arcuate convex surface 50 arranged to fit the surface 47. The member 48 is formed with a cylindrical boss portion 52 which is bored to snugly receive a bushing-like member 53 which also extends through an arcuately shaped opening 54 formed in the body portion of the holder 29. The member 53 is formed at its forward end with a flange 56, the outside diameter of which preferably coincides with the diameter of boss portion 52. As particularly shown in Figure 5 the peripheral surface of flange 56 is calibrated with suitable indices 57 to indicate degrees of rotary adjustment of member 53. The boss-like portion 52 is provided with an indexing line 58 for cooperation with the graduations of the flange 56. The other end of the member 53 is provided with a threaded portion 60 adapted to receive a knurled securing nut 61. The nut is preferably provided with openings 62 to accommodate a spanner wrench (not shown) or other suitable tool. Disposed adjacent the nut 61 is a fitting or spacing block 64 having a rear surface which coincides with the inner wall of the nut 61 and its opposite surface 65 of curved or arcuate shape to fit the curved surface 66 of the body portion of the holder 29. The knurled nut 61 may be manipulated to secure or lock member 48, the block 64 and bushing 53 in adjusted positions and this is accomplished by applying a suitable tool to the openings 62 and drawing the nut into close engagement to secure the parts together.

The face of portion 49 is provided with graduations 67 indicating degrees of angularity of the tool blank with respect to a horizontal plane through the upper or cutting edge of the tool. Thus as shown in Figure 5, the member 49 is canted so as to impart a clearance angle to the face or front edge portion of the tool blank B'. The tool blank B' is also rotated through an angle of 15 degrees as shown in Figures 5 and 6 for the purpose of securing desired clearance angles of a compound nature for the tool.

As shown in Figures 2, 3, and 4, the tool blank B' is of a large or standard size which slidably, yet snugly, fits a rectangular opening 70 in the bushing 53. When using standard large size tool bit blanks, the same may be fixedly held in the bushing by means of set screws 71 and 72. The cylindrical portion 52 is formed with a radial slot 73 to provide access to the securing or set screws 72 as illustrated in Figure 2.

Figure 8:
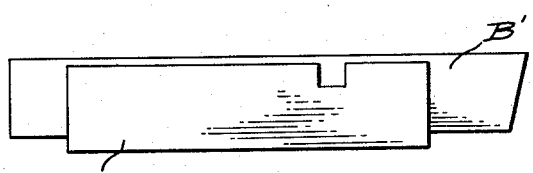
Figure 8 is an elevational view showing a tool bit of small size and nest block therefore.
Figure 9:
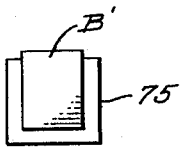
Figure 9 is a front elevational view of the tool bit and nest block shown in Figure 8.
Figure 7:
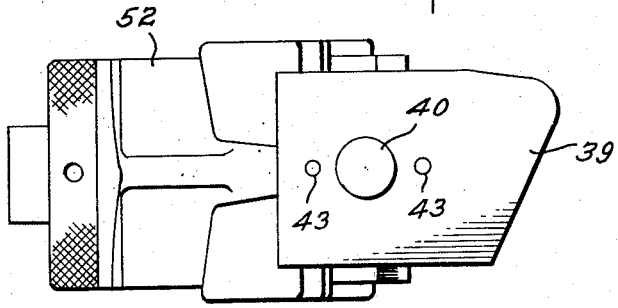
Figure 7 is a top plan view of the arrangement shown in Figure 2.

The tool bit or blank B' mounted in the fixture as shown in Figures 5 and 6 is of a smaller size than the tool bit B. When tools of a smaller size are to be formed or ground, a proper size nest block or fitting 75 is employed. A tool of a small size and a nest block to accommodate same to the dimension of the opening 70 formed in the bushing or holder 53 are shown in Figures 8 and 9. The nest block 75 is formed with a recess or channel to snugly accommodate the tool bit B', while the exterior dimension of block 75 accurately fits the opening 70. The set screws 71 and 72 engage the nest block 75 in order to securely hold the tool bit B' in the fixture.

The tool supporting fixture of my invention, having the means for universally adjusting the tool bit or blank, provides a medium for imparting varying degrees of angularity or compounding the clearance angles applied to tool bits. Figures 10 and 11 illustrate a form tool having different angularities of clearance on its leading, forward end and trailing edges and illustrates a typical example of tool bit formation that may be configurated or ground utilizing the fixture of my invention. As shown, the leading edge 80 of the tool has a relief or clearance angle of eighteen degrees, the forward end 81 a clearance angle of seven degrees and the trailing edge portion 82 a relief angle of eight degrees. To configurate or grind a tool bit with these specified clearance angles to settings of the grinding machine and the tool holder or fixture are as follows:

The grinding machine shown in Figure 1, or any grinding machine having a ball element or other suitable support adapted to accommodate the tool holding fixture, is adjusted so that the ball element or support is moved out of the plane of the grinding wheel face through an angle computed in the following manner: In determining the position of the ball support 23 of the grinding machine, a summation of the clearance angles of the leading and trailing edges is first made. Thus a summation of eighteen degrees and eight degrees gives a total of twenty six degrees. The result so attained is then divided by two, the quotient being thirteen degrees, the angularity that the ball support 23 is to be moved away from the plane of the grinding wheel. In the grinding machine shown, this is accomplished by rotating the knob 22 to move the crescent-shaped member 20 in a clockwise direction as viewed in Figure 1 through rack and pinion mechanism (not shown), the amount of angularity being indicated by graduations (not shown) provided on the periphery of the manipulating knob 22. When the tool bit supporting fixture is disposed upon the ball support 23, the tool bit would normally be tilted at an angle of thirteen degrees. To produce a clearance angle of fifteen degrees upon the forward end portion 81 of the tool, the member 48 is moved through an angle of two degrees indicated by the proper indicia 67 registering with the index line 68. This operation adds two degrees to the thirteen degrees so as to provide the fifteen degree clearance angle upon the end of the tool bit.

To provide the clearance angle on the leading end of eighteen degrees and a clearance of eight degrees on the trailing edge, it is then necessary to rotate or roll the bushing 53, carrying tool bit or tool blank through an angle of five degrees viz. until the five degree graduation 57 registers with the index line 58 formed on the cylindrical portion 52 of member 48. This operation adds five degrees to the initial cant or angle of thirteen degrees made on the ball support 23, and the resulting summation of eighteen degrees is the clearance angle sought for the leading edge of the tool. The five degrees of cant is, in effect, subtracted from the thirteen degree setting of the support 23 resulting in eight degrees, the desired clearance angle for the trailing edge 82 of the tool bit.

By this means of computation and adjustment of the supporting member 23 of the grinding machine, the angular adjustment of member 48 and the radial position of the tool bit supporting bushing 53, many combinations of clearance angles for a tool bit may be obtained. The relative positions of member 48 and bushing 53 with respect to the body 29 of the tool supporting fixture may be locked in adjusted position by drawing up the knurled nut 61. After these adjustments for various angles of clearance have been effected, the operator places the fixture in operative association with the grinding machine by fitting the socket 34 of the fixture over the support 23, to facilitate the bringing of the tool bit blank into engagement with the face of the grinding wheel 14 as shown in Figure 1. The operator then rocks the tool holding fixture on the ball support 23 while keeping the template configuration in the zone of the straight edge to bring various points and portions of the tool bit into engagement with the grinding wheel to finally shape the tool bit in correspondence with the configuration of the template. During the grinding operation, the abrasion of the tool blank continues until the pattern portions of the template engage the straight edge, thus preventing any further abrasion or grinding of tool, the finished tool form then bearing the pattern predetermined by the template. In the embodiment illustrated, the distance from the center of the ball support 23 to the template is twice the distance from the center of the ball support to the upper or cutting edge of the tool blank, a tool bit form or configuration of a high degree of accuracy is obtained due to the fact that the template or pattern from which the tool is configurated is of greater size than the finished tool bit form. While I have found this proportion of template size to tool bit size to be satisfactory, it is to be understood other proportions of template size to tool bit size may be employed without departing from the spirit and scope of the invention.

It is apparent that, within the scope of the invention, modifications and different arrangements may be made other than is herein disclosed, and the present disclosure is illustrative merely, the invention comprehending all variations thereof.

What I claim is:

A holder by which a tool may be supported and manipulated in cooperating relation with respect to the rotary abrading wheel of a grinding machine having a holder support in the form of a ball below said wheel and a template guiding surface above said wheel, said holder being in the form of an arm and the lower end thereof having a spherical socket for accommodating said ball to permit limited universal movement of the lower end of said holder upon said ball in planes at right angles with respect to one another, the upper end of said holder being formed to provide a transversely extending seat for a template which is adapted to cooperate with said guiding surface, an intermediate portion of said holder being arcuate and the walls thereof providing concave and convex seats, said intermediate portion being formed with a slot which extends through said seats, a sleeve extending through said slot and having a bore in which said tool is adapted to be removably secured, cooperating elements located at the opposite sides of said holder and engaging said seats, said elements having surfaces which conform to said seats and being apertured to accommodate opposite ends of said sleeve, said elements being adjustable on said seats to vary the angle of inclination of said tool and said sleeve being rotatable in said elements to adjust said tool about its longitudinal axis, and means for locking said elements and sleeve in the positions to which they are adjusted.

EDD C. OLIVER.

REFERENCES CITED

The following references are of record in the file of this patent:

UNITED STATES PATENTS

| Number | Name | Date |
|---|---|---|
| 467,857 | Conradson | Jan. 26, 1892 |
| 565,644 | Taylor | Aug. 11, 1896 |
| 704,348 | Lapointe | July 8, 1902 |
| 748,651 | Reimann | Jan. 5, 1904 |
| 765,304 | Bishop | July 19, 1904 |
| 1,058,353 | Cookingham | Apr. 8, 1913 |
| 1,121,995 | Elvers | Dec. 22, 1914 |
| 1,255,962 | Warner | Feb. 12, 1918 |
| 1,431,024 | Munthe | Oct. 3, 1922 |
| 1,771,621 | Fowler | July 29, 1930 |
| 1,987,832 | Knight | Jan. 15, 1935 |
| 2,144,095 | Zwick | Jan. 17, 1939 |
| 2,179,869 | Swanson | Nov. 14, 1939 |
| 2,375,620 | Bura | May 8, 1945 |
| 2,381,034 | Bura | Aug. 7, 1945 |
| 2,475,796 | Mader | July 12, 1949 |